(12) United States Patent
Verdier et al.

(10) Patent No.: US 8,563,462 B2
(45) Date of Patent: Oct. 22, 2013

(54) CATALYST COMPOSITIONS BASED ON NANOPARTICLES OF A ZIRCONIUM OXIDE, A TITANIUM OXIDE OR A MIXED ZIRCONIUM/TITANIUM OXIDE DEPOSITED ONTO A SILICA SUPPORT THEREFOR

(75) Inventors: Stephan Verdier, Lyons (FR);
Guillaume Criniere, Ixelles (BE);
Simon Ifrah, Lagord (FR); Rui Jorge Coelho Marques, Paris (FR)

(73) Assignee: Rhodia Operations, Aubervilliers (FR)

( * ) Notice: Subject to any disclaimer, the term of this patent is extended or adjusted under 35 U.S.C. 154(b) by 215 days.

(21) Appl. No.: 12/920,394

(22) PCT Filed: Feb. 23, 2009

(86) PCT No.: PCT/EP2009/052126
§ 371 (c)(1),
(2), (4) Date: Nov. 11, 2010

(87) PCT Pub. No.: WO2009/112355
PCT Pub. Date: Sep. 17, 2009

(65) Prior Publication Data
US 2011/0045967 A1 Feb. 24, 2011

(30) Foreign Application Priority Data
Mar. 3, 2008 (FR) ...................................... 08 01156

(51) Int. Cl.
*B01J 21/00* (2006.01)
*B01J 23/00* (2006.01)

(52) U.S. Cl.
USPC ........... 502/242; 502/349; 502/350; 977/773; 977/775; 977/776

(58) Field of Classification Search
USPC ........... 502/242, 349, 350; 977/773, 775, 776
See application file for complete search history.

(56) References Cited

U.S. PATENT DOCUMENTS 6,162,530 A 12/2000 Xiao et al.
2007/0140952 A1* 6/2007 Inoue et al. .................. 423/610
2008/0206562 A1* 8/2008 Stucky et al. ................. 428/403
2008/0254975 A1* 10/2008 Kitazaki et al. .............. 502/242
2010/0111789 A1 5/2010 Fajardie et al.

FOREIGN PATENT DOCUMENTS

JP 2002047032 A * 2/2002
RU 2 129 989 C1 5/1999
RU 2 194 666 C2 12/2000
WO WO 2008/025753 A2 3/2008

OTHER PUBLICATIONS

Dun et al., "Layer-by-Layer Self-Assembly of Multilayer Zirconia Nanoparticles on Silica Spheres for HPLC Packings" Anal. Chem. 2004, 76, 5016-5023.*
Pucher et al., "Nano-TiO2 sols immobilized on porous silica as a new efficient photocatalyst", Applied Catalysis A: General 332 (2007) 297-303.*
Ryu et al., "Deposition of Titania Nanoparticles of Spherical Silica" Journal of Sol-Gel Science and Technology 26, 489-493, 2003.*
Grieken et al., "Synthesis of size-controlled silica-supported $TiO_2$ photocatalysts", Journal of Photochemistry and Photobiology A: Chemistry, 2002, pp. 315-322, vol. 148, 2002 Elsevier Science B.V.
Lopez-Munoz et al., "Role of the support on the activity of silica-supported $TiO_2$ photocatalysts: Structure of the $TiO_2$/SBA-15 photocatalysts", Catalysts Today, 2005, pp. 307-314, vol. 101, 2005 Elsevier Science B.V.
Reddy et al., "Dehydration of 4-methylpentan-2-ol over $Ce_xZr_{1-x}O_2$/$SiO_2$ nano-composite catalyst" Journal of Molecular Catalysis A: Chemical, 2006, pp. 355-360, vol. 258, 2006 Elsevier Science B.V.
Kuo et al., "Immobilization and photocatalytic efficiency of titania nanoparticles on silica carrier spheres", J. Mater. Res., 2006, pp. 2290-2297, vol. 21, No. 9.

* cited by examiner

*Primary Examiner* — Anthony J Zimmer
(74) *Attorney, Agent, or Firm* — Dentons US LLP

(57) ABSTRACT

Catalyst compositions include finely divided nanoscale particles of at least one supported oxide, based on a zirconium oxide, a titanium oxide or a mixed zirconium/titanium oxide deposited onto a silica based support, wherein, after calcination for 4 hours at 900° C., the supported oxide is in the form of nanoscale particles deposited onto the support, the size of the particles being at most 5 nm when the at least one supported oxide is based on a zirconium oxide, being at most 10 nm when the at least one supported oxide is based on a titanium oxide and being at most 8 nm when the at least one supported oxide is based on a mixed zirconium/titanium oxide; such catalyst compositions are especially useful for the selective reduction of NOx.

15 Claims, No Drawings

CATALYST COMPOSITIONS BASED ON NANOPARTICLES OF A ZIRCONIUM OXIDE, A TITANIUM OXIDE OR A MIXED ZIRCONIUM/TITANIUM OXIDE DEPOSITED ONTO A SILICA SUPPORT THEREFOR

CROSS-REFERENCE TO PRIORITY/PCT APPLICATIONS

This application is a National Stage of PCT/EP 2009/052126, filed Feb. 23, 2009 and designating the United States (published in the French language on Sep. 17, 2009, as WO 2009/112355 A1; the title and abstract were also published in English), which claims priority of FR 0801156, filed Mar. 3, 2008, each hereby expressly incorporated by reference in its entirety and each assigned to the assignee hereof.

The present invention relates to a composition based on a zirconium oxide, a titanium oxide or a mixed zirconium titanium oxide on a support based on silica, to its methods of preparation and to its use as catalyst.

Catalysts often consist of an active phase, having the desired catalytic properties, and a support on which this active phase is deposited. It is important for catalyst efficiency for the active phase to be dispersed as finely as possible on the support, that is to say this active phase takes the form of fine nonaggregated particles on the support. Furthermore, since catalysts are often exposed to high temperatures, it is also necessary for the finely divided state of the active phase to be maintained even at these temperatures. In other words, there must be no sintering of the particles.

The objective of the invention is to develop catalysts that meet these requirements.

For this purpose, the composition of the invention according to a first embodiment comprises at least one supported oxide based on a zirconium oxide, a titanium oxide or a mixed zirconium titanium oxide on a silica-based support, and is characterized in that, after calcination for 4 hours at 900° C., the supported oxide is in the form of particles deposited on said support, the size of which is at most 5 nm when the supported oxide is based on a zirconium oxide, at most 10 nm when the supported oxide is based on a titanium oxide and at most 8 nm when the supported oxide is based on a mixed zirconium titanium oxide.

According to a second embodiment, the composition comprises at least the same type of supported oxide and the same type of support and is characterized in that, after calcination for 4 hours at 1000° C., the supported oxide is in the form of particles deposited on said support, the size of which is at most 7 nm when the supported oxide is based on a zirconium oxide, at most 19 nm when the supported oxide is based on a titanium oxide and at most 10 nm when the supported oxide is based on a mixed zirconium titanium oxide.

Other features, details and advantages of the invention will become even more clearly apparent from reading the following description and from the various specific, but nonlimiting, examples for illustrating it.

The term "rare earth" is understood to mean the elements of the group formed by yttrium and those elements of the Periodic Table having atomic numbers between 57 and 71 inclusive.

In the rest of the description, the term "specific surface area" is understood to mean the BET specific surface area determined by nitrogen adsorption in accordance with the ASTM D 3663-78 standard established from the Brunauer-Emmett-Teller method described in the periodical The Journal of the American Chemical Society, 60, 309 (1938).

Furthermore, calcinations for a given temperature and for a given time correspond, unless otherwise indicated, to calcinations in air with a temperature hold for the time indicated.

The composition of the invention comprises a supported oxide in the form of nanoscale particles, these particles being deposited on a support. By this it should be understood that the supported oxide particles are predominantly present on the surface of this support, it being understood that the particles may be present inside the pores of the support but still remaining on the surface of these pores.

This supported oxide may firstly be a zirconium oxide by itself, i.e. a single oxide, in $ZrO_2$ form.

The supported oxide may also be a doped zirconium oxide, that is to say it may be based on a zirconium oxide and at least one oxide of another element M selected from praseodymium, lanthanum, neodymium and yttrium. In this case, the zirconium oxide $ZrO_2$ is the essential or predominant constituent, the element or elements M then constituting the rest of the supported oxide.

The content of element M is at most 50% by weight, the zirconium oxide constituting at least 50% by weight of the supported oxide. This content is expressed by weight of oxide of the element M or of all of the elements M relative to the mass of the supported oxide in its entirety (zirconium oxide and one or more oxides of the element or elements M). This content of element M may vary widely and may especially be between 5% and 40% and more particularly between 10% and 40%. This content may most particularly be between 10% and 30%.

The supported oxide may also be titanium oxide $TiO_2$.

The supported oxide may also be a mixed zirconium titanium oxide. The term "mixed oxide" is understood here to mean a solid solution of titanium and zirconium oxides in the form of a pure crystallographic phase of $ZrTiO_4$ structure. In this case, analysis of the product using the XRD (X-ray diffraction) technique does not reveal any structure other than the $ZrTiO_4$ structure. This structure corresponds to the JCPDS reference 34-415. This solid solution is generally present with proportions that may be between 30% and 40% by weight of titanium oxide relative to the total weight of the mixed oxide.

It should be noted here that the composition may comprise several types of oxides at the same time on the support, that is to say zirconium oxide particles, titanium oxide particles and mixed oxide particles.

The supported oxide is of crystalline form.

The supported oxide is present in the composition of the invention in the form of nanoscale particles.

It should be noted here that these particles may either be individual particles or possibly in the form of aggregates.

The size values given in the present description are average sizes determined by the XRD technique. A value measured by XRD corresponds to the size of the coherent domain calculated from the width of the three most intense diffraction lines in the (x,y,z) space group, using the Debye-Scherrer model.

The sizes of the supported oxide particles were given above depending on the supported oxide and on the conditions under which the composition is calcined. It should be noted here that the values given for a composition calcined at 1000° C. (second embodiment) may apply to a composition that has previously also been calcined at 900° C. for 4 hours, showing that there is no substantial sintering of the supported oxide particles when the compositions of the invention are exposed to an increase in temperature between 900° C. and 1000° C.

According to preferred embodiments of the invention, the size of the supported oxide particles may be even lower than those given above. Thus, for compositions calcined for 4 hours at 900° C., this size may be at most 4 nm when the supported oxide is based on an optionally doped zirconium oxide and at most 7 nm when the supported oxide is based on a titanium oxide or a mixed zirconium titanium oxide. The minimum size of the particles is not critical and may be very small. Purely by way of indication, the size of the particles may be at least 2 nm, more particularly at least 3 nm, when the supported oxide is based on an optionally doped zirconium oxide and at least 3 nm, more particularly at least 4 nm, when the supported oxide is based on a titanium oxide or a mixed zirconium titanium oxide. These minimum values are also given here for compositions calcined for 4 hours at 900° C.

For compositions calcined for 4 hours at 1000° C., this size may be at most 6 nm when the supported oxide is based on an optionally doped zirconium oxide, at most 15 nm when the supported oxide is based on a titanium oxide and at most 8 nm when the supported oxide is based on a mixed zirconium titanium oxide. Here again, purely by way of indication and still as regards compositions calcined for 4 hours at 1000° C., the size of the particles may be at least 2 nm, more particularly at least 3 nm, when the supported oxide is based on an optionally doped zirconium oxide, at least 6 nm, more particularly at least 7 nm, when the supported oxide is based on a titanium oxide and at least 5 nm, more particularly at least 6 nm, when the supported oxide is based on a mixed zirconium titanium oxide.

The latter values may apply to compositions which have previously also been calcined at 900° C. for 4 hours.

The supported oxide content of the composition of the invention is generally at most 50% by weight of the entire composition (supported oxide and support). It may especially be at most 30%.

The minimum supported oxide content is that above which a person skilled in the art knows that it is possible to obtain a sufficient catalytic activity, this minimum content being fixed depending on the desired performance of the composition. Merely as an example, this minimum content is generally at least 3% and more particularly at least 4% by weight.

The supported oxide content may especially be between 10% and 50%, more particularly between 10% and 30%.

The support for the compositions of the invention is based on silica.

Considering catalytic applications of the compositions of the invention, a silica adapted to these uses is employed. Thus, it is preferred to use a silica having a high and stable specific surface area, i.e. one that remains at a suffient value even after exposure to a high temperature. As an example, a silica having a surface area of at least 100 m$^2$/g, preferably at least 150 m$^2$/g, may be used.

This silica may be a precipitated silica or a pyrogenic silica. Optionally, the silica may be stabilized by a stabilizing element, such as for example aluminum.

Silicas suitable for the invention that may be mentioned by way of example are those described in WO 2005/061384 and WO 99/49850.

Finally, the compositions of the invention may have a high BET specific surface area which, after calcination for 4 hours at 900° C., may be at least 80 m$^2$/g, more particularly at least 120 m$^2$/g and even more particularly at least 150 m$^2$/g. After calcination for 4 hours at 1000° C., these compositions may have a surface area of at least 50 m$^2$/g, more particularly at least 80 m$^2$/g and even more particularly at least 100 m$^2$/g.

According to one particular embodiment, silicas that have been calcined beforehand at a temperature between 600° C. or 650° C. and 900° C. and have a loss on ignition (LOI) of between 2% and 15%, more particularly between 2 and 10%, (measured at constant weight), are used as support.

The compositions of the invention may be prepared by various methods, which will now be described.

A. First Method of Preparing the Compositions of the Invention

This first method comprises the following steps:
a suspension of the support is brought into contact with a colloidal dispersion of a zirconium and/or titanium compound and, where appropriate, of a compound of the element M;
the mixture thus formed is spray-dried; and
the dried product thus obtained is calcined.

The first step of this method therefore consists in forming a mixture from a colloidal dispersion of a zirconium compound or from a colloidal dispersion of a titanium compound or else from a dispersion comprising both a zirconium compound and a titanium compound, depending on the nature of the supported oxide in the composition that it is intended to prepare. For the preparation of a composition in which the supported oxide is a mixture of a zirconium oxide and at least one oxide of another element M, this mixture further includes a colloidal dispersion of an oxide of this element. It is also possible to use a single colloidal dispersion in which the colloids are based on a mixed oxide comprising zirconium oxide and an oxide of the element M. The present description applies of course here to the case in which the supported oxide comprises several elements M and it will be understood that, in this same case, it would be possible to use several dispersions of various elements M or optionally a single colloidal dispersion comprising all the elements M. For the sake of concision, reference will be made in the rest of the description only to a dispersion of an element M, although the description should be understood as applying to the case given above.

The term "colloidal dispersion" denotes any system consisting of fine solid particles of colloidal dimensions, that is to say dimensions lying between about 1 nm and about 100 nm (measured using the technique of quasi-elastic light scattering), based on a zirconium compound, a titanium compound and/or a compound of the element M, the latter compound generally being an oxide and/or a hydrated oxide, in stable suspension in an aqueous liquid phase, it being furthermore possible, optionally, for said particles to contain residual amounts of bonded or adsorbed ions, such as for example nitrate, acetate, chloride or ammonium ions. It should be noted that in such a colloidal dispersion the zirconium, titanium or the element M may be either completely in the form of colloids or simultaneously in the form of ions and in the form of colloids.

A mixture is formed by mixing the dispersion with a suspension of the support. In particular, a colloidal silica dispersion may be used. In general, the suspension is an aqueous suspension.

The mixing is carried out in an aqueous phase, generally in water, for example distilled water or deionized water.

The second step of the method is a drying step.

This is carried out by spray drying.

The term "spray drying" is understood to mean an operation in which the mixture is dried by being sprayed in a hot atmosphere. The spray drying may be carried out by means of any sprayer of a type known per se, for example by a spray nozzle of the showerhead rose or the like. It is also possible to use what are called turbine atomizers. With regard to the various spraying techniques that can be used in the present method, the reader may refer in particular to the fundamental work by Masters entitled "Spray Drying", second edition, 1976, published by George Godwin, London.

The spray-drying output temperature may for example be between 80° C. and 150° C.

The last step of the method is a calcination step.

This calcination serves to develop the crystallinity of the supported product and it may also be adjusted and/or selected according to the subsequent operating temperature required of the composition according to the invention, taking into account the fact that the specific surface area of the product is lower the higher the calcination temperature employed. Such a calcination is generally carried out in air, but a calcination carried out for example in an inert gas or in a controlled (oxidizing or reducing) atmosphere is of course not excluded.

In practice, the calcination temperature is generally limited to a range between 500° C. and 800° C., preferably between 600° C. and 700° C. The calcination time is adjusted in a known manner and may for example vary between 30 minutes and 4 hours, this time generally being shorter the higher the temperature.

B. Second Method of Preparing the Compositions of the Invention

The compositions of the invention may also be prepared by a second method, which will be described below.

This method comprises the following steps:
a liquid mixture comprising a zirconium or titanium salt and, where appropriate, a salt of the element M and a suspension of the support is formed;
the mixture thus formed is heated to a temperature of at least 100° C.;
the precipitate thus obtained is recovered; and
said precipitate is calcined.

The first step also starts with a suspension of the support, but the mixing takes place with a zirconium salt and/or a titanium salt and a salt of the element M in the case of compositions in which the supported oxide is based on a zirconium oxide and on an oxide of another element M. The mixing is carried out in an aqueous phase, generally in water. The starting silica suspension may optionally be acidified.

The salts are preferably inorganic salts and may be selected from nitrates, sulfates, acetates and chlorides.

Thus, examples that may more particularly be mentioned are zirconyl sulfate, zirconyl nitrate and zirconyl chloride. It is also possible to use a titanium oxychloride or a titanium oxysulfate.

The next step of the method is that of heating the liquid mixture thus formed.

The temperature at which the liquid mixture is heated is at least 100° C. and even more particularly at least 130° C. Thus, it may be between 100° C. and 150° C. The heating operation may be carried out by introducing the liquid mixture into a sealed enclosure (a closed reactor of the autoclave type). Under the temperature conditions given above, and in an aqueous medium, it may thus be mentioned, by way of illustration, that the pressure in the closed reactor may vary between a value greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). The heating may also be carried out in an open reactor for temperatures close to 100° C.

The heating may be carried out either in air or in an inert gas atmosphere, preferably in nitrogen.

The heating time may vary widely, for example between 1 and 48 hours, preferably between 2 and 24 hours. Likewise, the rate of temperature rise is not critical, and thus the fixed reaction temperature may be reached by heating the liquid mixture for example between 30 minutes and 4 hours, these values being given merely as an indication.

After the heating step, a solid precipitate is recovered which may be separated from its medium by any conventional solid-liquid separation technique such as, for example, filtration, sedimentation, spin drying or centrifugation.

The product as recovered may then undergo a number of washing operations, which are carried out using water or optionally a basic solution, for example an ammonia solution, or else an acid solution, for example a nitric acid solution.

According to one particular variant of the invention, the method includes a maturation.

This maturation is generally carried out on a suspension obtained after resuspending the precipitate in water, especially after the washing. The maturation takes place by again heating this suspension. The temperature at which the suspension is heated is at least 40° C., more particularly at least 60° C. and even more particularly at least 100° C. Generally, this temperature is at most 200° C. and more particularly at most 150° C. The medium is thus maintained at a constant temperature for a time which is usually at least 30 minutes and more particularly at least 1 hour. The maturation may be carried out at atmospheric pressure or optionally at a higher pressure.

The last step of this second method is a calcination step that may be carried out in the same way as in the case of the first method, and therefore what was described above in respect of this calcination likewise applies here.

C. Third Method of Preparing the Compositions of the Invention

The compositions of the invention may also be prepared by a third method, which will now be described. This method comprises the following steps:
a liquid mixture is formed that contains a suspension of the support and at least one zirconium or titanium salt and, where appropriate, a salt of the element M;
a base is brought into contact with the above mixture so as to form a precipitate;
the precipitate thus obtained is recovered; and
said precipitate is calcined.

The first step of this third method is similar to the first step of the second method and what was described above in this regard therefore likewise applies here.

The second step consists in obtaining a precipitate by reacting the mixture formed in the previous step with a base.

As base, products of the hydroxide, carbonate or hydroxycarbonate type may for example be used. The following may be mentioned: alkali or alkaline-earth hydroxides and secondary, tertiary or quaternary amines. However, amines and aqueous ammonia may be preferred insofar as they reduce the risks of pollution by alkali or alkaline-earth metal cations. Urea may also be mentioned.

The contacting step may be carried out in any order in a liquid medium.

The step of contacting with the base leads to the formation of a precipitate in suspension in the liquid reaction medium.

More particularly, the addition of the base is carried out until the pH of the reaction mixture becomes at least 7.

According to a variant of this method, the latter may include an optional additional step that consists in subjecting the suspension resulting from the above step to a maturation. The maturation is carried out by heating the suspension at a temperature of at least 60° C., more particularly at least 80° C. Generally, this temperature is at most 200° C., more particularly at most 150° C. The medium is thus maintained at a constant temperature for a time which is usually at least 30 minutes and more particularly at least 1 hour. The maturation may be carried out at atmospheric pressure or optionally at a higher pressure.

The precipitate is recovered and calcined in the same manner as described above in respect of the second method particularly.

The compositions of the invention as described above or as obtained by the previously described methods take the form of powders, but optionally they may undergo a forming operation to make them into granules, beads, cylinders or honeycombs of variable dimensions.

The compositions of the invention may be used as catalysts. Thus, the invention also relates to catalytic systems comprising the compositions of the invention. These systems comprise a washcoat having catalytic properties based on these compositions and on a binder of known type, the washcoat being applied to a substrate, for example of the metallic or ceramic monolith type. This washcoat is obtained by mixing the composition with the binder so as to form a suspension that can then be deposited on the substrate.

These catalytic systems and more particularly the compositions of the invention may have very many applications. Thus, they are particularly well suited to, and therefore usable in, a catalysis of various reactions such as, for example, the dehydration, hydrosulfuration, hydrodenitrification, desulfuration, hydrodesulfuration, dehydrohalogenation, reforming, steam reforming, cracking, hydrocracking, hydrogenation, dehydrogenation, isomerization, dismutation, oxychlorination and dehydrocyclization of hydrocarbons or other organic compounds, oxidation and/or reduction reactions, the Claus reaction, the treatment of exhaust gases for internal combustion engines, in particular for postcombustion in automobiles and especially three-way catalysis, demetallization, methanation, shift conversion, catalytic oxidation of soot emitted by internal combustion engines, such as diesel or gasoline engines operating with a lean mixture. Finally, the catalytic systems and the compositions of the invention may be used as catalyst for the selective reduction of NOx, by reduction reaction of these NOx by any reducing agent of the hydrocarbon type, or by ammonia or urea and, in this case, as catalyst for the hydrolysis or decomposition reaction of urea to ammonia (the SCR process).

In these uses in catalysis, the compositions of the invention may be employed in combination with precious metals or with transition metals in oxide, sulfide or other form, and they thus act as support for these metals. The nature of these metals and the techniques for incorporating them into the support compositions are well known to those skilled in the art. For example, the metals may be gold, silver, platinum, rhodium, palladium or iridium, molybdenum, tungsten, nickel, cobalt, manganese or vanadium. They may be used by themselves or in combination and may especially be incorporated into the compositions by impregnation.

To treat exhaust gases, the aforementioned systems are mounted in a known manner in the exhaust lines of motor vehicles.

Examples will now be given.

EXAMPLE 1

This example relates to the preparation, using the first method of the invention, of a composition based on zirconium oxide dispersed on a silica support in respective proportions by weight of oxide of 30% and 70%.

Firstly, a colloidal $ZrO_2$ solution was prepared. To do this, a concentrated $ZrO(NO_3)_2$ solution was diluted with deionized water in order to obtain 600 ml of a $ZrO(NO_3)_2$ solution containing 80 g/l eq. $ZrO_2$, the pH of the solution being 2. A 28% $NH_3$ solution was instantly added so that the final pH reached 10 and the formation of a precipitate was observed. The precipitate was filtered and then washed with 6 l of deionized water. The cake was resuspended in deionized water (pH=7.5) and acidified by adding a 68% $HNO_3$ nitric acid solution in such a way that the concentration was 10 eq. wt % $ZrO_2$. After stirring overnight, a colloidal solution clear to the eye was obtained, the size of the particles of which were measured by quasi-elastic light scattering, was 4 nm.

Aminocaproic acid (98% 6-aminocaproic acid from Aldrich) was added, with stirring, so as to increase and stabilize the pH at 4.5, to 430 g of this colloidal solution followed by, again with stirring, 100 g of silica powder (Rhodia Siloa® with a specific surface area of 170 $m^2$/g and an LOI of 15%). The suspension thus obtained was kept stirred for 30 minutes and then spray-dried on a Büchi® unit at 110° C. (outlet temperature 110° C.; inlet temperature 220° C.) with a flow rate of 1 l/h. The powder obtained was calcined in air at 700° C. for 4 hours.

EXAMPLE 2

This example relates to preparation according to the third method of the invention of a zirconium-oxide-based composition on a silica support in respective proportions by weight of oxide of 10% and 90%.

The silica used was Tixosil 68® having a solids content at 900° C. of 90% (LOI: 10%) and a specific surface area of 160 $m^2$/g. The zirconium source was a $ZrO(NO_3)_2$ solution having a solids content at 900° C. of 19.1%. A 10% dilute ammonia solution was prepared by addition of one volume of 28% $NH_3$ with two volumes of water.

A stock was formed in the reactor by introducing 59.80 g of silica (i.e. 54 g of $SiO_2$) diluted with 771 ml of deionized water (70 g/l eq. $SiO_2$) and then 68% $HNO_3$ was added so as to obtain a dispersion with a pH of 2. Next, 31.41 g of $ZrO(NO_3)_2$ solution (i.e. 6 g of eq. $ZrO_2$) diluted to 86 ml with deionized water (70 g/l eq. $ZrO_2$) were introduced into the stock, to which the ammonia solution was then added at 10 ml/min until a pH of 9 was obtained (mass added: 32 g).

The whole mixture was transferred to an autoclave and heated, with stirring, at 150° C. for 2 hours.

The cooled mixture was then separated by filtration and washed isovolumetrically with water at ambient temperature. The cake was then calcined in air at 700° C. for 4 hours.

EXAMPLE 3

This example relates to the preparation according to the third method of the invention of a zirconium-oxide-based composition on a silica support in respective proportions by weight of oxide of 30% and 70%.

The same silica, the same zirconium source and the same ammonia solution as in Example 2 were used.

A stock was formed in the reactor by introducing 46.51 g of silica (i.e. 42 g of $SiO_2$) diluted with 600 ml of deionized water (70 g/l eq. $SiO_2$) and then 68% $HNO_3$ so as to obtain a dispersion having a pH of 2. Next, 94.24 g of a $ZrO(NO_3)_2$ solution (i.e. 18 g eq. $ZrO_2$) diluted to 257 ml with deionized water (70 g/l eq. $ZrO_2$) were introduced into the stock to which the ammonia solution was then added at 10 ml/min until a pH of 9 was obtained (mass added: 73 g).

Next, the autoclaving treatment, the washing and the calcination were carried out in the same way as in Example 2.

EXAMPLE 4

This example relates to the preparation according to the third method of the invention of a titanium-oxide-based composition on a silica support in respective proportions by weight of oxide of 10% and 90%.

200 g of Tixosil 68® silica powder were dispersed in 570 ml of water to which $HNO_3$ was added in order to obtain a pH of 0.5. Next, 26.8 g of $TiOCl_2$ (21 eq. wt % of $TiO_2$) were added to the mixture obtained, after which 10% $NH_4OH$ was added so as to bring the pH to 7.

Next, the autoclaving treatment, the washing and the calcination were carried out in the same way as in Example 2.

EXAMPLE 5

This example relates to the preparation according to the third method of the invention of a titanium-oxide-based composition on a silica support in respective proportions by weight of oxide of 30% and 70%.

155.6 g of silica powder of Example 2 were dispersed in 470 ml of water to which 13.3 g of concentrated $HNO_3$ were added in order to obtain a pH of 0.5. Next, 80.37 g of $TiOCl_2$ diluted in 204.6 ml of water were added to the mixture obtained, after which 10% $NH_4OH$ was added so as to bring the pH to 7.

Next, the autoclaving treatment, the washing and the calcination were carried out in the same way as in Example 2.

EXAMPLE 6

This example relates to the preparation according to the third method of the invention of a composition based on a mixed zirconium titanium oxide on a silica support in respective proportions by weight of oxide of 30% for $ZrTiO_4$ and 70% for $SiO_2$.

155.6 g of silica powder of Example 2 were dispersed in 470 g of water to which 10 g of concentrated $HNO_3$ were added in order to obtain a pH of 0.5. Next, 30.9 g of $TiOCl_2$ and 39.24 g of $ZrOCl_2$ diluted in 208 ml of water were added, after which 10% $NH_4OH$ was added so as to bring the pH to 7.

Next, the autoclaving treatment, the washing and the calcination were carried out in the same way as in Example 2. XRD analysis revealed only the presence of the $ZrTiO_4$ phase.

The following examples are comparative examples employing the known technique of impregnation.

COMPARATIVE EXAMPLE 7

This example relates to the preparation of a titanium-oxide-based composition on a silica support in respective proportions by weight of oxide of 10% and 90%.

A composition containing 90% $SiO_2$ and 10% $TiO_2$ was prepared by dry impregnation of 16.09 g of silica according to Example 2 with 6.64 g of a 25.1 wt % $TiOCl_2$ solution prediluted in 23.5 ml of $H_2O$.

The powder was then calcined in air at 700° C. for 4 hours. XRD confirmed that only the anatase phase was present between 700 and 900° C.

COMPARATIVE EXAMPLE 8

This example relates to the preparation of a titanium-oxide-based composition on a silica support in respective proportions by weight of oxide of 30% and 70%.

A mixture containing 70% $SiO_2$ and 30% $TiO_2$ was produced by dry impregnation of 12.88 g of silica according to Example 2 with 20.49 g of a 25.1 wt % $TiOCl_2$ solution prediluted in 9 ml of $H_2O$.

The powder was then calcined in air at 700° C. for 4 hours.

COMPARATIVE EXAMPLE 9

This example relates to the preparation of a titanium-oxide-based composition on a silica support in respective proportions by weight of oxide of 30% and 70%.

A mixture containing 70% $SiO_2$ and 30% $TiO_2$ was produced by dry impregnation of 22.5 g of silica according to Example 2 with 15.45 g of a 25.1 wt % $TiOCl_2$ solution prediluted in 14.3 ml of $H_2O$.

The powder was then calcined in air at 700° C. for 4 hours. XRD confirmed that only the $ZrTiO_4$ phase was present between 700 and 1000° C.

The following table gives the characteristics of the compositions obtained in the various examples, that is to say their BET specific surface area and the size of the supported oxide particles at the various calcination temperatures.

TABLE

| | 900° C. calcination | | 1000° C. calcination | |
|---|---|---|---|---|
| Example | BET surface area ($m^2/g$) | Particle size (nm) | BET surface area ($m^2/g$) | Particle size (nm) |
| 1 | 129 | 5 | 100 | 6 |
| 2 | 137 | 2 | 107 | 4 |
| 3 | 169 | 4 | 97 | 6 |
| 4 | 133 | 5 | 107 | 10 |
| 5 | 133 | 7 | 98 | 15 |
| 6 | 120 | 7 | 100 | 8 |
| 7 (comparative) | 112 | 16 | 85 | 23 |
| 8 (comparative) | 102 | 17 | 77 | 21 |
| 9 (comparative) | 92 | 11 | 70 | 12 |

The table shows that the compositions according to the invention have supported oxides of markedly smaller particle size than that of the oxides of the compositions obtained by the known technique of impregnation.

The invention claimed is:

1. A catalyst composition consisting of finely divided nanoscale particles of a supported oxide, wherein the oxide is selected from the group consisting of a zirconium oxide, a titanium oxide and a mixed zirconium/titanium oxide, deposited onto a silica-based support, wherein, after calcination for 4 hours at 900° C., the supported oxide is in the form of nanoscale particles deposited onto said support, the size of the nanoscale particles is at most 5 nm when the supported oxide is a zirconium oxide, at most 10 nm when the supported oxide is a titanium oxide and at most 8 nm when the supported oxide is a mixed zirconium/titanium oxide.

2. A catalyst composition consisting of finely divided nanoscale particles of a supported oxide, wherein the oxide is selected from the group consisting of a zirconium oxide, a titanium oxide or a mixed zirconium/titanium oxide, deposited onto a silica-based support, wherein, after calcination for 4 hours at 1,000° C., the supported oxide is in the form of nanoscale particles deposited on said support, the size of the nanoscale particles is at most 7 nm when the supported oxide is a zirconium oxide, at most 19 nm when the supported oxide is a titanium oxide and at most 10 nm when the supported oxide is a mixed zirconium/titanium oxide.

3. The catalyst composition as defined by claim 1, having a supported oxide content of at most 50% by weight.

4. The catalyst composition as defined by claim 1, wherein the supported oxide is in the form of nanoscale particles, the size of the nanoscale particles is at most 4 nm when the supported oxide is a zirconium oxide and at most 7 nm when the supported oxide is a titanium oxide or a mixed zirconium/titanium oxide.

5. The catalyst composition as defined by claim 2, wherein the supported oxide is in the form of nanoscale particles, the size of the nanoscale particles is at most 6 nm when the supported oxide is a zirconium oxide, at most 15 nm when the supported oxide is a titanium oxide and at most 8 nm when the supported oxide is a mixed zirconium/titanium oxide.

6. A method of preparing a catalyst composition as defined by claim 1, comprising the following steps:
   (i) contacting a suspension of the support with a colloidal dispersion of a zirconium and/or titanium compound;
   (ii) spray-drying the mixture thus formed; and
   (iii) calcining the dried product thus obtained.

7. The method of preparing a catalyst composition as defined by claim 1, comprising the following steps:
   (i) providing a liquid mixture which comprises a zirconium or titanium salt, and a suspension of the support;
   (ii) heating the mixture thus formed to a temperature of at least 100° C.;
   (iii) recovering the precipitate thus obtained; and
   (iv) calcining said precipitate.

8. The method of preparing a catalyst composition as defined by claim 1, comprising the following steps:
   (i) providing a liquid mixture that contains a suspension of the support and at least one zirconium or titanium salt and, optionally, a salt of an element M;
   (ii) contacting a base with the above mixture to form a precipitate;
   (iii) recovering the precipitate thus obtained; and
   (iv) calcining said precipitate.

9. The method as defined by claim 8, wherein the precipitate obtained after the step of contacting with the base is subjected to a maturation operation.

10. The catalyst composition as defined by claim 1, comprising at least one supported crystalline oxide.

11. The catalyst composition as defined by claim 1, said silica-based support comprising a stabilizing element therefor.

12. The catalyst composition as defined by claim 1, wherein the silica-based support has been calcined before having the oxide deposited thereon at a temperature between 600° C. and 900° C., and which has a loss on ignition (LOI) of between 2% and 15%.

13. The catalyst composition as defined by claim 1, wherein the silica-based support has been calcined before having the oxide deposited thereon at a temperature between 650° C. and 900° C., and which has a loss on ignition (LOI) of between 2% and 15%.

14. The catalyst composition as defined by claim 2, wherein the silica-based support has been calcined before having the oxide deposited thereon at a temperature between 600° C. and 900° C., and which has a loss on ignition (LOI) of between 2% and 15%.

15. The catalyst composition as defined by claim 2, wherein the silica-based support has been calcined before having the oxide deposited thereon at a temperature between 650° C. and 900° C., and which has a loss on ignition (LOI) of between 2% and 15%.

* * * * *